United States Patent
Roeckl et al.

(10) Patent No.: US 9,663,024 B2
(45) Date of Patent: May 30, 2017

(54) METHOD FOR CONTROLLING A HEADLAMP

(71) Applicant: GM GLOBAL TECHNOLOGY OPERATIONS LLC, Detroit, MI (US)

(72) Inventors: Philipp Roeckl, Aschaffenburg (DE); Thomas Feid, Mannheim (DE); Frank Langkabel, Ruesselsheim (DE); Ingolf Schneider, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 98 days.

(21) Appl. No.: 14/246,746

(22) Filed: Apr. 7, 2014

(65) Prior Publication Data

US 2015/0002014 A1    Jan. 1, 2015

(30) Foreign Application Priority Data

Apr. 6, 2013  (DE) .......................... 10 2013 006 045

(51) Int. Cl.
*B60R 22/00* (2006.01)
*B60Q 1/14* (2006.01)
*B60Q 1/08* (2006.01)

(52) U.S. Cl.
CPC ........... *B60Q 1/1423* (2013.01); *B60Q 1/085* (2013.01); *B60Q 1/143* (2013.01); *B60Q 2300/054* (2013.01); *B60Q 2300/45* (2013.01)

(58) Field of Classification Search
CPC . B60Q 2300/054; B60Q 1/085; B60Q 1/1423
USPC .................................................... 315/82, 152
See application file for complete search history.

(56) References Cited

U.S. PATENT DOCUMENTS

| | | | | |
|---|---|---|---|---|
| 6,379,022 B1* | 4/2002 | Amerson | ........... | H05B 33/0863 362/1 |
| 6,443,603 B1* | 9/2002 | Eberhardt | .............. | B60Q 1/085 362/464 |
| 8,224,533 B2 | 7/2012 | Furusawa | | |
| 2005/0162856 A1* | 7/2005 | Ito | ............................. | B60Q 1/14 362/464 |
| 2005/0275562 A1* | 12/2005 | Watanabe | .............. | B60Q 1/085 340/933 |
| 2007/0247072 A1* | 10/2007 | Norimatsu | ............. | B60Q 1/143 315/92 |
| 2009/0086497 A1* | 4/2009 | Kamioka | ............... | B60Q 1/085 362/466 |
| 2009/0237008 A1* | 9/2009 | Noguchi | ................ | B60Q 1/143 315/297 |

(Continued)

FOREIGN PATENT DOCUMENTS

DE      102008062640 A1    7/2009
DE      102009051485 A1    6/2010
(Continued)

OTHER PUBLICATIONS

Search Report dated Oct. 15, 2014 in Application GB1405207.0.

*Primary Examiner* — Redhwan K Mawari
(74) *Attorney, Agent, or Firm* — Lorenz & Kopf LLP (57) ABSTRACT

A method is disclosed for controlling a headlight in a motor vehicle. The method includes providing a headlight configured to emit a light distribution in a selectively controlled manner, and controlling the headlight to generate a dynamic wave effect in at least one sub-region in front of the vehicle within the illuminated light distribution.

14 Claims, 5 Drawing Sheets

(56) References Cited

U.S. PATENT DOCUMENTS

| | | | |
|---|---|---|---|
| 2009/0302766 A1* | 12/2009 | Behr | B60Q 1/0023 315/82 |
| 2012/0206050 A1* | 8/2012 | Spero | B60Q 1/04 315/152 |
| 2013/0218410 A1* | 8/2013 | Chen | B60Q 1/143 701/36 |
| 2013/0242100 A1* | 9/2013 | Seki | B60Q 1/04 348/148 |
| 2014/0029279 A1 | 1/2014 | Suckling | |
| 2014/0029289 A1 | 1/2014 | Mochizuki et al. | |
| 2014/0056012 A1 | 2/2014 | Yamazaki | |
| 2015/0002014 A1* | 1/2015 | Roeckl | B60Q 1/1423 315/82 |
| 2015/0239542 A1* | 8/2015 | Aoki | B63H 11/107 440/12.56 |

FOREIGN PATENT DOCUMENTS

| | | |
|---|---|---|
| DE | 102012002226 A1 | 8/2012 |
| DE | 102011078288 A1 | 1/2013 |
| DE | 102011081382 A1 | 2/2013 |
| DE | 102012015618 A1 | 2/2014 |
| EP | 2280215 A2 | 2/2011 |
| EP | 2574502 A1 | 4/2013 |
| EP | 2666670 A2 | 11/2013 |

* cited by examiner

METHOD FOR CONTROLLING A HEADLAMP

CROSS REFERENCE TO RELATED APPLICATION

This application claims priority to German Patent Application No. 102013006045.1, filed Apr. 6, 2014, which is hereby incorporated by reference in its entirety.

TECHNICAL FIELD

The technical field relates to a method for controlling a headlight in a motor vehicle.

BACKGROUND

Modern motor vehicles often use vehicle headlights which in addition to emitting light, perform other functions in order to increase safety on the roads.

As such adaptive headlight systems, for example, are known from the prior art which automatically adapt to environmental conditions. In this respect light and driving conditions are taken into account, in order to create systems such as cornering-light assistants, turning-off-light assistants or full-beam assistants.

The light image of a static or dynamic light distribution is generally configured such that the driver obtains a homogenous impression of an overall light distribution. Also additional light functions such as a static turning-off light, or a dynamic cornering light are configured so that individual light segments merge seamlessly into one another.

A vehicle headlight is known from the DE 10 2008 062 640 A1. The vehicle headlight encompasses a plurality of LED light sources, which are combined in a joint matrix, wherein individual LED light sources are implemented so as to be controllable, in order to change a light distribution of the light-emitting matrix. To this end provisions are made in the vehicle headlight for a storage unit, in which a light distribution is stored as a brightness value for each individual LED light source, and for an evaluation and control unit, which, depending on a received parameter, selects a stored light distribution and controls the LED light sources of the light source matrix for setting the selected light distribution accordingly. In this specification the received parameter is a panning angle.

One basic requirement on which the present disclosure is based consists in providing a method for controlling a headlight with which the safety on the road can be further increased.

Further aspects of the present disclosure can be combined in a technologically meaningful manner, whereby some effects can be obtained which go beyond the sum of individual effects. The description, in particular when read in conjunction with the drawing, additionally characterizes and particularizes the present disclosure.

SUMMARY

Accordingly a method for controlling a headlight in a motor vehicle is therefore provided, including: providing a headlamp assembly having a light source which are configured such that a light distribution is emitted; and controlling the light source in such a way that a dynamic wave effect is generated in front of the motor vehicle within the emitted light distribution in at least one sub-region.

Due to the dynamic wave effect, the attention of a vehicle driver is deliberately drawn in direction of the sub-region. The driver's attention is thus guided in this direction without panning the overall light distribution.

In one embodiment the light distribution with the at least one sub-region is generated by means of a plurality of light sources arranged in the headlight. A change in the light distribution can be created in a simple manner by controlling individual light sources of the headlight.

In a further embodiment a detector is provided which is suitable for selecting the sub-region in front of the motor vehicle. The detector thus determines the sub-region to which the driver's attention shall be specifically drawn. In a further embodiment the detector includes a camera system, a radar system, a navigation system or a direction indicator. The mentioned detectors all represent a way of drawing the driver's attention to situations which require to be specifically observed.

In a further embodiment the detector may detect a danger spot, preferably a person, another vehicle, an obstacle or an animal or a desired driving direction, in front of the motor vehicle. This direction or the region which requires particular attention may for example represent a danger spot recorded by the camera, or the navigation direction or a driving direction. In the first case the danger spot is indicated to the driver by means of a dynamic wave effect so that the driver can react accordingly. In the second case the region requiring particular attention is supportive of navigation or a turning-off operation since the region requiring particular attention has a supporting effect upon the driver, which in particular during night drives in unknown territory is a distinct improvement.

In a further embodiment generation of the dynamic wave effect in the light distribution is effected by locally changing the brightness of the light sources, which preferably follows the course of a sine curve. This dynamic movement is translated by the headlight system in that the number of light sources illuminates individual road regions divided in the horizontal or vertical axis. The dynamic wave effect within the light distribution is achieved by dimming these light sources respectively up or down similar to the course of a sine curve.

In a further embodiment the wave effect may assume a vertical or a horizontal direction within the light distribution. Depending on the overlap of individual light sources the dynamic wave effect may spread in any direction. A vertical or horizontal direction is particularly suited for creating a region requiring particular attention.

In a further embodiment the dynamic wave effect can generate a topological altitude image within the light distribution. By selectively separating the individual light sources, a particular light distribution may be created. Depending on how sharp the respective light sources are delineated in the edge region, this light/dark contrast can be used to create the impression of a topological altitude image.

The method described and the advantageous designs may be provided in a motor vehicle with a headlight, in particular in a control unit for controlling a headlight.

The headlamp assembly may include a control unit having a digital processor unit or CPU data-connected with a storage system and a bus system, a working memory RAM as well as a storage means. The CPU is designed to process commands implemented as a program stored in a storage system, to detect input signals from the data bus and to issue signals to the data bus. The storage system may include different storage media such as optical, magnetic, solid-state bodies and other non-volatile media, on which a respective computer program is stored for performing the method as well as the advantageous implementation. The program may be designed such that it embodies, or is able to execute, the methods described here, thereby enabling the CPU to perform the steps of such methods and to control the motor vehicle headlights.

The method can be performed by a suitable computer program which includes program code means for executing all steps of any of the claims, when the program is run on a computer. The computer program can be read into already existing control units and can be used to control a headlight with adjustable illuminating direction. To this effect provisions are made for a computer program product with program code stored on a computer-readable data carrier in order to perform the method according to any of the claims, when the program product is executed on a computer. The computer program product may be integrated with control units as a retrofit option.

A further aspect of the present disclosure relates to an apparatus for controlling a headlight in a motor vehicle, including a headlight configured such that a light distribution is emitted with at least one sub-region, and a control unit controlling the light sources to generate a dynamic wave effect in the light distribution in at least the sub-region a dynamic wave effect in front of the motor vehicle within an illuminated region.

In one embodiment of the apparatus the light distribution with the at least one sub-region is generated by several light sources arranged in the headlight. A detector, such as a camera system, a radar system, a navigation system or a direction indicator, is provided which is suitable to select the sub-region present in front of the motor vehicle. The detector can detect a danger spot, preferably a person, another vehicle, an obstacle or an animal or a desired driving direction, present in front of the motor vehicle.

In a further embodiment of the apparatus generation of the dynamic wave effect in the light distribution is produced by locally changing the brightness of several light sources, which preferably follows the course of a sine curve. The wave effect within the light distribution can assume a vertical or a horizontal direction. Alternately, the wave effect within the light distribution can generate a topological altitude image.

BRIEF DESCRIPTION OF THE DRAWINGS

The present disclosure will hereinafter be described in conjunction with the following drawing figures, wherein like numerals denote like elements, and.

In the following several embodiments are explained with reference to the drawings, in which.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description. In the figures identical or functionally identical components are marked with the same reference symbols.

Figure 1:
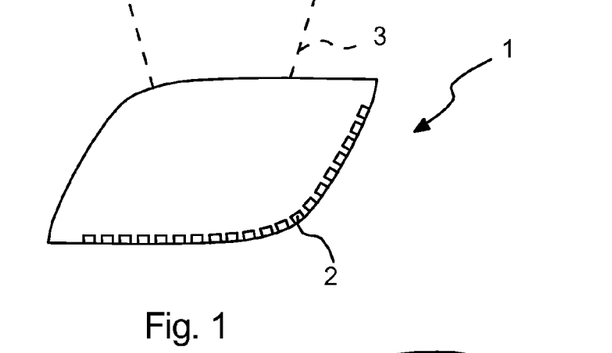
FIG. 1 shows a headlight with a plurality of light sources, which can be activated or deactivated independently of one another.

FIG. 1 schematically shows a headlight 1 with numerous light sources 2 arranged inside it. The light sources 2 may e.g. be light-emitting diodes or LEDs. By controlling the light sources 2 in a selective independent manner, a light beam 3 emitted by the headlight 1 can be influenced selectively in its intensity and lighting direction. Alternately, it is feasible for the headlight 1 to include a lighting unit with several lighting sources which are adjustable in their alignment via an actuator so that a light beam 3 emitted by the lighting unit can be selectively influenced. Or an aperture may be arranged in front of the lighting unit. The aperture may have rollers, lenses and elements impermeable to light arranged inside it, which are not shown and which are adjustable via an actuator so that a light beam 3 emitted by the lighting unit can be influenced as regards its light intensity and lighting direction. Furthermore a light distribution can be generated with a headlight, which directs a light beam such as a laser onto the road through selectively controllable actuators.

Figure 2:
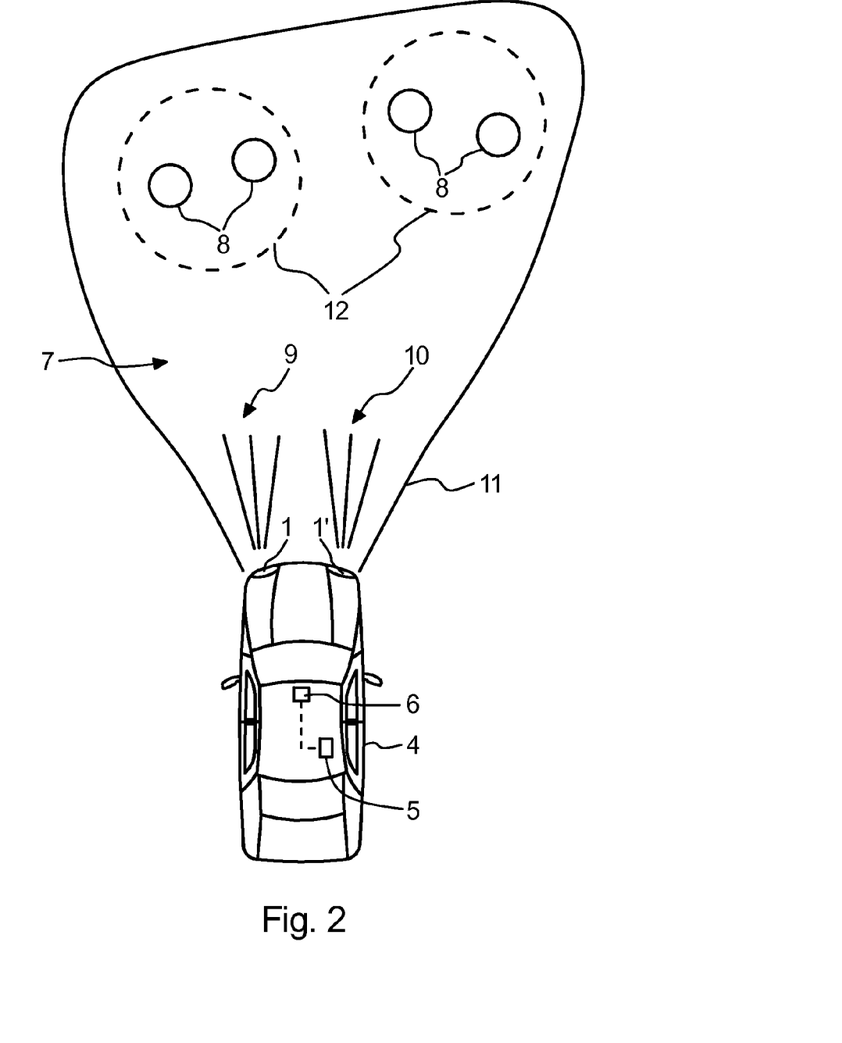
FIG. 2 schematically shows a motor vehicle with several objects present in front of the vehicle.

FIG. 2 schematically shows a top view of a motor vehicle 4. The motor vehicle 4 is equipped with headlights 1 and 1' as well as with a control unit 5 for setting the light sources 2. The control unit 5 includes a data-transferring connection with a detection means 6. As presently preferred, the detection means 6 is a camera system suitable for detecting a region 7 in front of the vehicle 1 and processing an image in the control unit 5. In particular objects such as persons 8 present in the region 7 can be recognized. The light beams 9 and 10 of the headlights 1 and 1' normally directed so as to extend straight ahead result in a light distribution 11, inside which the persons 8 are illuminated.

Now, in order to create a region of attention for a driver, the light sources 2 of headlights 1 and 1' are controlled in such a way that in the region 7 in front of the motor vehicle 4, a dynamic wave effect in the light distribution 11 is generated in sub-regions 12 at the location of persons 8. Due to the generated dynamics the attention of the driver of the motor vehicle 4 is selectively drawn in the direction of the sub-region. The driver's attention is guided in this direction without panning the overall light distribution.

Figure 3:
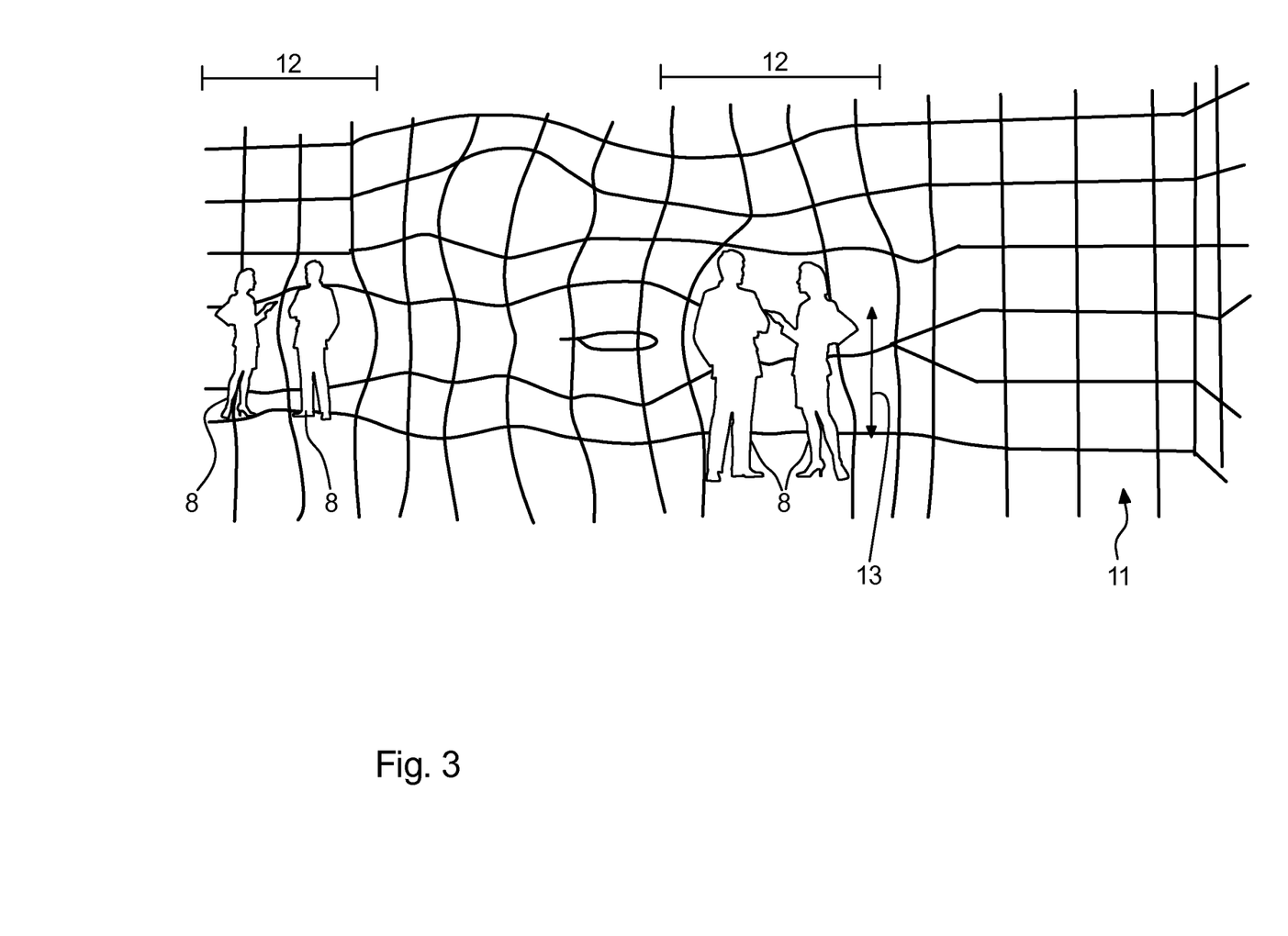
FIG. 3 schematically shows a light distribution when applying the method according to one embodiment of the present disclosure.

The resulting light distribution 11, as viewed by the driver of the motor vehicle 4, is illustrated in FIG. 3. It can be recognized that in the sub-regions 12 at the location of the persons 8 a different illumination is generated, which arises in the form of a wave effect in that individual light sources 2 are dimmed up or down, so that in terms of legal provisions an illumination is created (see arrow 13) which changes locally and over time. Arrow 13 shall symbolize an illumination changing in a given direction, wherein of course a horizontal, vertical or any other direction is also possible. Generation of the dynamic wave effect in the light distribution 11 is caused by locally changing the brightness of the light sources 2, wherein the change follows for example the course of a sine curve.

Figure 4A:
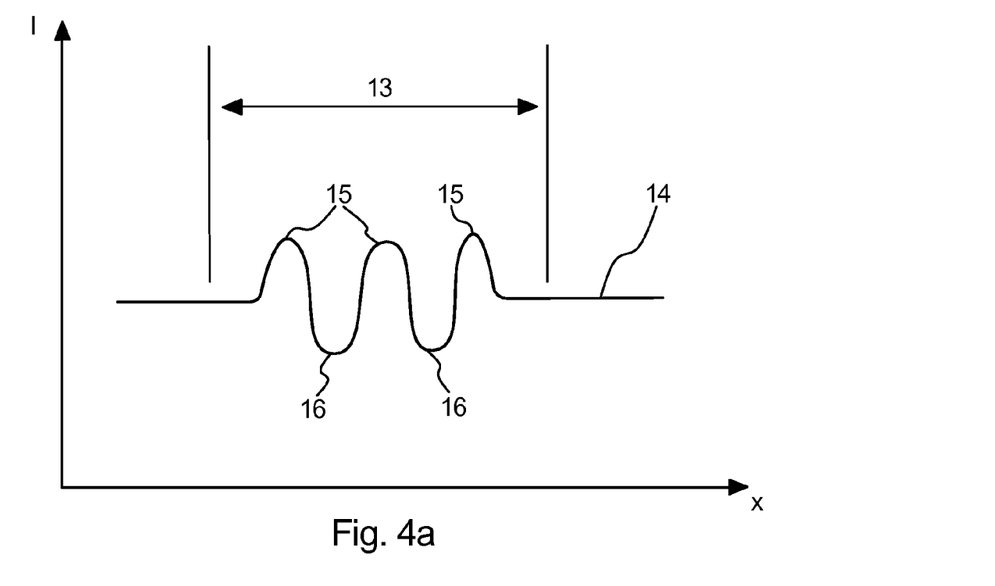
FIG. 4a shows a diagram of a light intensity at a first point in time, when applying the method according to one embodiment of the present disclosure.
Figure 4B:
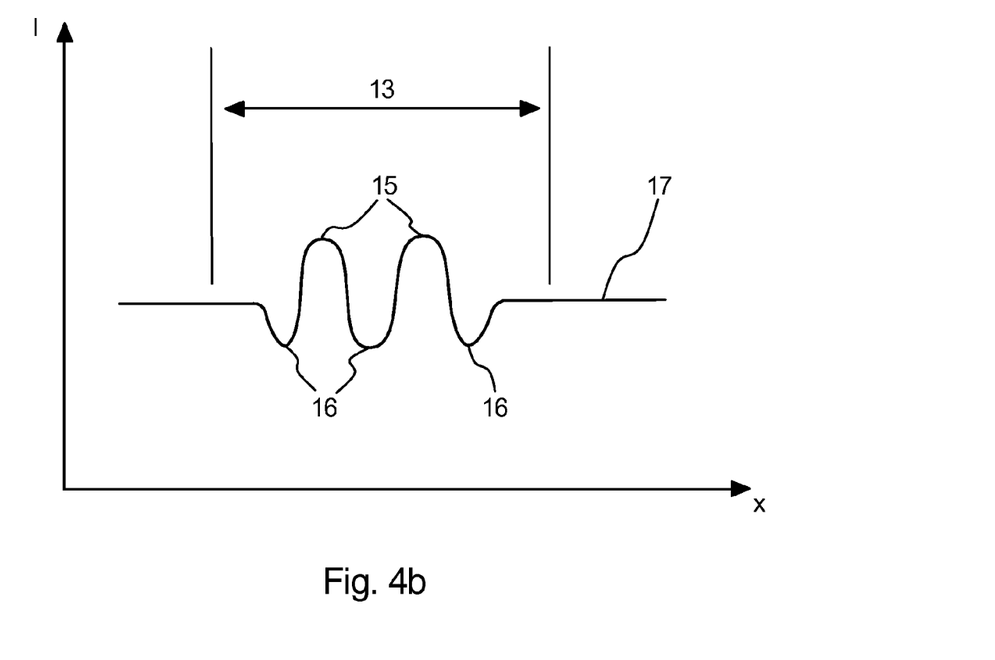
FIG. 4b shows a further diagram of a light intensity at a second point in time, when applying the method according to one embodiment of the present disclosure, FIG. 5 schematically shows a further light distribution, when applying the method according to one embodiment of the present disclosure, and FIG. 6 schematically shows a flow diagram of a procedure for controlling a headlight in a motor vehicle.

One example of a light distribution with dynamic wave effect is shown in FIG. 4a. FIG. 4a shows an intensity progression 14 at a first point in time in the area of the dynamic wave effect. The intensity progression 14 follows a line as indicated by arrow 13 in FIG. 3. The intensity progression 14 is plotted along a location coordinate x. It can be recognized that the intensity progression 14 includes three maxima 15 and two minima 16 at a first point in time. In FIG. 4b a further intensity progression 17 is shown at a second, later point in time. The further intensity progression 17 includes two maxima 15 and three minima 16, so that by moving the maxima and minima a dynamic effect is created. For a defined dimming up and dimming down, i.e. increase and decrease of the light distribution on the road of individual light sources 2 in terms of the admissible legal provisions a kind of intrinsic dynamics can be created within the light distribution 11. Similar to the light reflections on a wall or on a ceiling of water tank dynamic effects can be created within the light distribution 11 without moving the overall light distribution.

The detection means 6 used in the previous embodiments has been described as a camera system, wherein of course a radar system could also be used for detecting persons 8, animals or objects. Another possibility consists in using a navigation system or a direction indicator as detection means 6. In this case the sub-region 12 supports navigation or a turning-off operation, because the sub-region 12 can be chosen such that it highlights the desired driving direction and thus has a directional or supporting effect on the driver.

Figure 5:
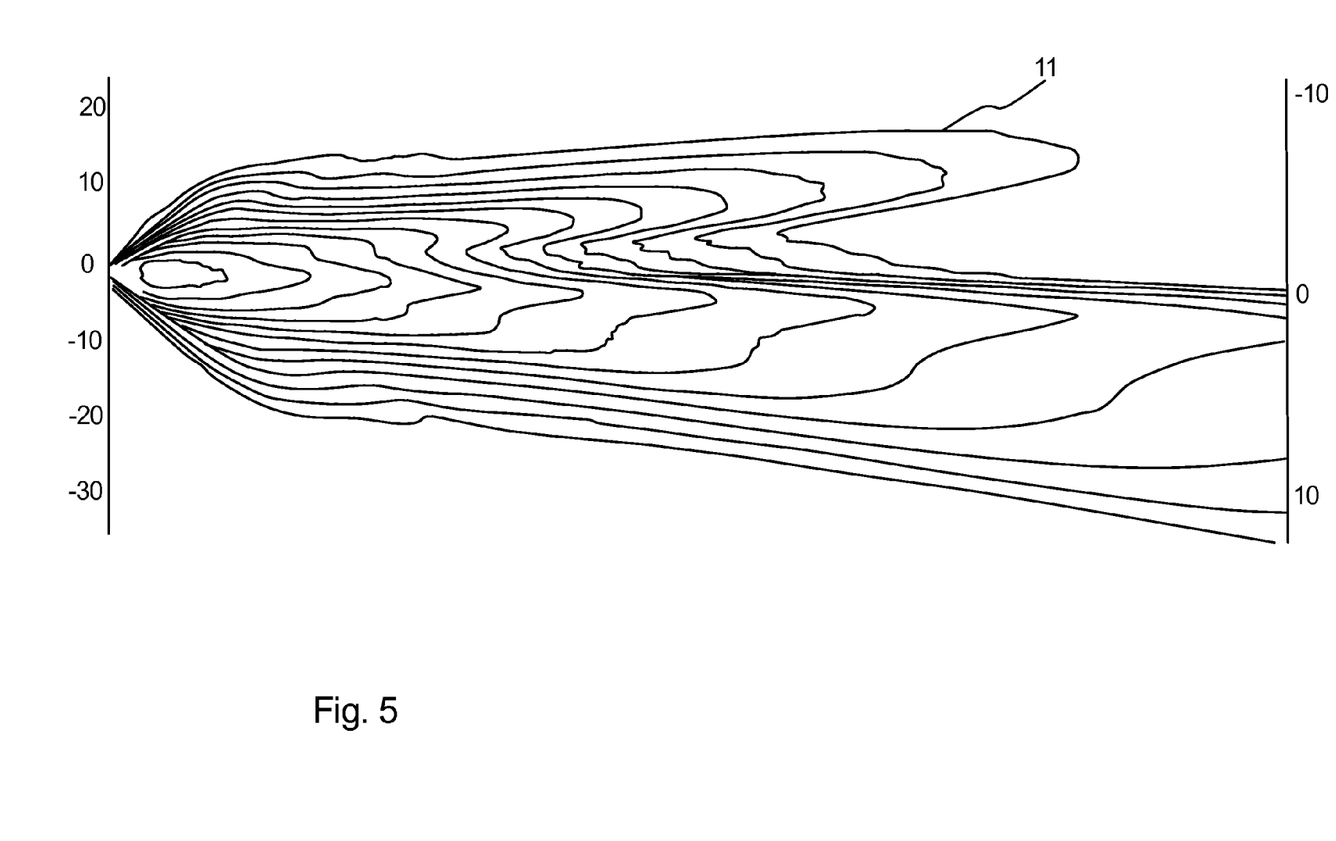

In a further embodiment the dynamic wave effect creates the impression of a topological altitude image within the light distribution 11. Pulling the individual light sources 2 selectively apart creates a particular light distribution 11. Depending on how sharp the respective light sources are delineated in the edge region, this light/dark contrast can be used to create the impression of a topological altitude image. An example for this light distribution 11 is shown in FIG. 5. The motor vehicle 4 in this illustration is on the left-hand side at the point of origin.

Figure 6:
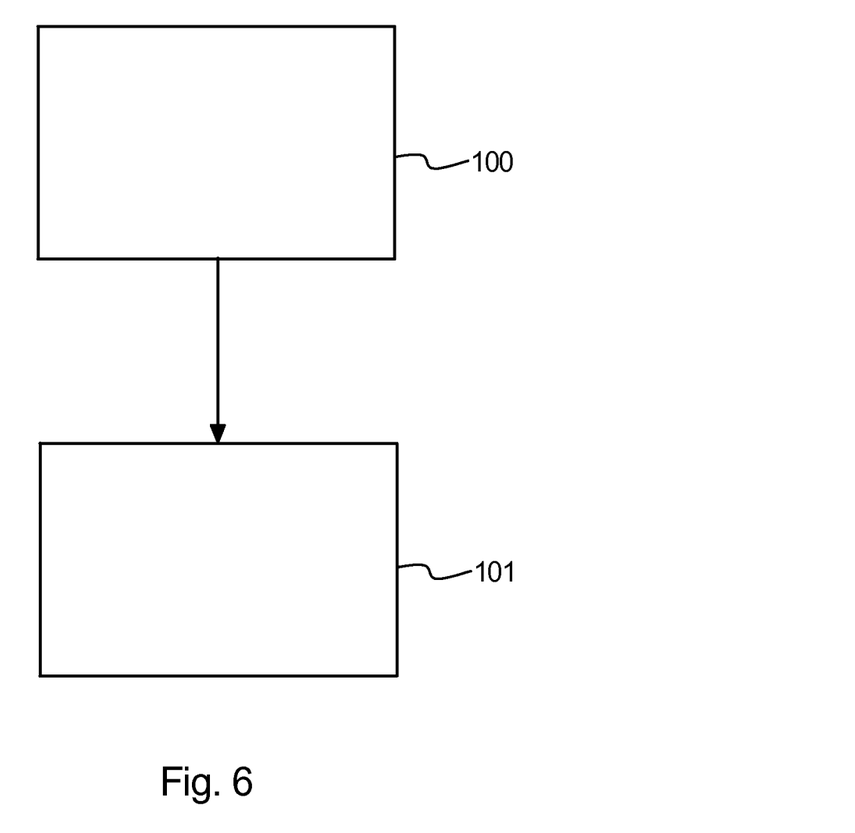

FIG. 6 schematically shows a procedure which can be implemented in the control unit 5 of the motor vehicle 2. In a step 100 a headlight 1 is provided which is configured such that the light distribution 11 is emitted with at least one sub-region 12. In step 101 the light sources 2 are controlled in such a way that in the region 7 in front of the motor vehicle 1 a dynamic wave effect is created within the light distribution 11 in the sub-region 8.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A method for controlling the illuminated light distribution of a headlight in a region in front of a motor vehicle comprising:
    determining, by a processor, at least one first sub-region in front of the motor vehicle without a pedestrian and at least one second sub-region in front of the motor vehicle where a pedestrian is located;
    controlling, by the processor, the headlight to generate a substantially fixed light distribution in the at least one first sub-region and to generate a dynamically changing sinusoidal light distribution in the at least one second sub-region by locally changing the brightness of a light beam emitted by the headlight within the at least one second sub-region over time.

2. The method according to claim 1, further comprising generating the dynamically changing sinusoidal light distribution within the at least one second sub-region with a plurality of light sources arranged in the headlight.

3. The method according to one of claims 2, further comprising selectively controlling the plurality of light sources to generate the dynamically changing sinusoidal light distribution.

4. The method according to claim 1, further comprising:
    determining, by the processor, at least one third sub-region in front of the motor vehicle containing an object; and
    controlling, by the processor, the headlight to generate the dynamically changing sinusoidal light distribution in the at least one third sub-region.

5. The method according to claim 1, further comprising:
    determining, by the processor, at least one third sub-region in front of the motor vehicle containing a desired direction of travel of the motor vehicle; and
    controlling, by the processor, the headlight to generate the dynamically changing sinusoidal light distribution in the at least one third sub-region.

6. The method according to claim 1, wherein the processor is configured to determine at least one first sub-region and the at least one second sub-region based upon data from a detector selected from the group consisting of a camera system, a radar system, a navigation system, a driving direction system, and combinations thereof.

7. The method according to claim 1, wherein the dynamically changing sinusoidal light distribution comprises a wave effect within the at least one second sub-region in a preferred direction.

8. The method according to claim 1, wherein the dynamically changing sinusoidal light distribution comprises a light/dark contrast of the light sources delineated from each other in their respective light distribution edge region.

9. A headlight assembly for a motor vehicle comprising:
    a processor configured to determine at least one first sub-region in front of the motor vehicle without a pedestrian and at least one second sub-region in front of the motor vehicle where a pedestrian is located; and
    a headlamp having a plurality of independently controllable light sources,
    wherein the processor is further configured to control the plurality of light sources to generate a substantially fixed light distribution in the at least one first sub-region and to generate a dynamically changing sinusoidal light distribution in the at least one second sub-region over time.

10. The headlight assembly according to claim 9, wherein the processor is further configured to determine at least one third sub-region in front of the motor vehicle containing an object and to control the plurality of light sources to the dynamically changing sinusoidal light distribution in the at least one third sub-region.

11. The headlight assembly according to claim 9, wherein the processor is further configured to determine at least one third sub-region in front of the motor vehicle containing a desired direction of travel of the motor vehicle, and to control the plurality of light sources to the dynamically changing sinusoidal light distribution in the at least one third sub-region.

12. The headlight assembly according to claim 9, wherein the processor is configured to determine the at least one first sub-region and the at least one second sub-region based upon data from a detection device selected from the group consisting of a camera system, a radar system, a navigation system, a driving direction system, and combinations thereof.

13. The headlight assembly according to claim 9, wherein the dynamically changing sinusoidal light distribution comprises a wave effect in a preferred direction.

14. The headlight assembly according to claim 9, wherein the dynamically changing sinusoidal light distribution comprises a light/dark contrast of the light sources delineated from each other in their respective light distribution edge region.

\* \* \* \* \*